United States Patent
Watler et al.

(10) Patent No.: US 7,373,136 B2
(45) Date of Patent: May 13, 2008

(54) METHOD AND SYSTEM FOR DATA RATING FOR WIRELESS DEVICES

(75) Inventors: Theodore W. Watler, Long Beach, CA (US); Jerry Hanley, Santa Monica, CA (US)

(73) Assignee: Telemac Corporation, Culver City, CA (US)

( * ) Notice: Subject to any disclaimer, the term of this patent is extended or adjusted under 35 U.S.C. 154(b) by 454 days.

(21) Appl. No.: 09/911,868

(22) Filed: Jul. 23, 2001

(65) Prior Publication Data

US 2002/0022471 A1 Feb. 21, 2002

Related U.S. Application Data

(60) Provisional application No. 60/220,029, filed on Jul. 21, 2000, provisional application No. 60/220,233, filed on Jul. 21, 2000.

(51) Int. Cl.
*H04M 11/00* (2006.01)

(52) U.S. Cl. .................. 455/405; 455/406; 455/407; 379/112.01; 379/126

(58) Field of Classification Search ............... 455/405, 455/406, 407; 379/112.01, 114.01, 114.21, 379/115.01, 112.03, 126, 127.01
See application file for complete search history.

(56) References Cited

U.S. PATENT DOCUMENTS

| | | | |
|---|---|---|---|
| 4,868,758 A | 9/1989 | Kokubu | |
| 4,887,265 A | 12/1989 | Felix | |
| 5,159,592 A | 10/1992 | Perkins | |
| 5,185,785 A | 2/1993 | Funk et al. | |
| 5,325,418 A | 6/1994 | McGregor et al. | |
| 5,396,539 A | 3/1995 | Slekys et al. | |
| 5,517,549 A | 5/1996 | Lee | |
| 5,528,664 A | 6/1996 | Slekys et al. | |
| 5,533,019 A | 7/1996 | Jayapalan | |
| 5,577,100 A | 11/1996 | McGregor et al. | |
| 5,592,535 A | 1/1997 | Klotz | |
| 5,625,669 A | 4/1997 | McGregor et al. | |

(Continued)

FOREIGN PATENT DOCUMENTS

WO    WO 93/20644 A1    10/1993

(Continued)

*Primary Examiner*—Nghi H. Ly
(74) *Attorney, Agent, or Firm*—Townsend and Townsend and Crew LLP; Guy W. Chambers

(57) ABSTRACT

A method and system for rating a data communication session between a network and a wireless device is disclosed. In an exemplary embodiment, the method monitors a series of events, namely, a setup event, a begin event and an end event, which take place during a communication session. The monitoring of such events is accomplished by a data rating application which resides on the wireless device. By monitoring such events, the data rating application is then able to rate the communication session using a number of rating options. The rating option selected includes both how to meter the data transmitted during a data communication session and determine the rate to be applied to each metered increment. Examples of methods used to meter the data include time and volume. Different rating options which can be used to rate the communication session include, for example, application, data utilization, source of data, class of service, quality of service and transmission efficiency.

67 Claims, 1 Drawing Sheet

U.S. PATENT DOCUMENTS

| | | | |
|---|---|---|---|
| 5,625,877 A * | 4/1997 | Dunn et al. | 455/454 |
| 5,631,947 A | 5/1997 | Wittstein et al. | |
| 5,667,249 A * | 9/1997 | Critelli | 283/70 |
| 5,684,861 A * | 11/1997 | Lewis et al. | 455/405 |
| 5,729,740 A | 3/1998 | Tsumura | |
| 5,740,247 A | 4/1998 | Violante et al. | |
| 5,809,122 A | 9/1998 | Jang | |
| 5,812,945 A | 9/1998 | Hansen et al. | |
| 5,854,985 A * | 12/1998 | Sainton et al. | 455/553.1 |
| 5,892,816 A | 4/1999 | Sih et al. | |
| 5,915,226 A | 6/1999 | Martineau | |
| 5,923,741 A | 7/1999 | Wright et al. | |
| 5,930,341 A | 7/1999 | Cardillo, IV et al. | |
| 5,937,041 A | 8/1999 | Cardillo, IV et al. | |
| 5,960,416 A | 9/1999 | Block | |
| 6,029,064 A | 2/2000 | Farris et al. | |
| 6,044,264 A | 3/2000 | Huotari et al. | |
| 6,055,441 A | 4/2000 | Wieand et al. | |
| 6,070,067 A | 5/2000 | Nguyen et al. | |
| 6,078,268 A | 6/2000 | Koga | |
| 6,085,082 A | 7/2000 | Kochler et al. | |
| 6,088,600 A | 7/2000 | Rasmussen | |
| 6,091,968 A | 7/2000 | Koohgoli et al. | |
| 6,098,878 A * | 8/2000 | Dent et al. | 235/380 |
| 6,101,378 A * | 8/2000 | Barabash et al. | 455/406 |
| 6,138,002 A * | 10/2000 | Alperovich et al. | 455/407 |
| 6,141,652 A | 10/2000 | Reeder | |
| 6,148,191 A | 11/2000 | Kim | |
| 6,185,413 B1 | 2/2001 | Mueller et al. | |
| 6,192,248 B1 * | 2/2001 | Solondz | 455/450 |
| 6,199,054 B1 | 3/2001 | Khan et al. | |
| 6,226,272 B1 | 5/2001 | Okano et al. | |
| 6,311,054 B1 | 10/2001 | Korpela | |
| 6,385,444 B1 | 5/2002 | Peschel et al. | |
| 6,400,695 B1 * | 6/2002 | Chuah et al. | 370/310 |
| 6,434,537 B1 * | 8/2002 | Grimes | 705/40 |
| 6,480,710 B1 | 11/2002 | Laybourn et al. | |
| 6,496,690 B1 | 12/2002 | Cobo et al. | |
| 6,542,728 B1 * | 4/2003 | Kaku | 455/406 |
| 6,662,231 B1 * | 12/2003 | Drosset et al. | 709/229 |
| 6,725,031 B2 * | 4/2004 | Watler et al. | 455/405 |
| 6,760,417 B1 * | 7/2004 | Wallenius | 379/114.28 |
| 7,137,548 B2 * | 11/2006 | Schilling | 235/375 |

FOREIGN PATENT DOCUMENTS

| | | |
|---|---|---|
| WO | WO 97/26739 A1 | 7/1997 |
| WO | WO 97/45814 A1 | 12/1997 |
| WO | WO 98/23110 A2 | 5/1998 |
| WO | WO 99/48317 A2 | 9/1999 |
| WO | WO 99/49626 A2 | 9/1999 |
| WO | WO 99/62223 A2 | 12/1999 |
| WO | WO 00/04701 A1 | 1/2000 |
| WO | WO 00/19700 A1 | 4/2000 |
| WO | WO 00/38369 A1 | 8/2000 |

* cited by examiner

METHOD AND SYSTEM FOR DATA RATING FOR WIRELESS DEVICES

CROSS-REFERENCES TO RELATED APPLICATIONS

This application claims the benefit of priority under 35 U.S.C. § 119 from U.S. Provisional Patent Application Ser. No. 60/220,029 filed on Jul. 21, 2000 and U.S. Provisional Patent Application Ser. No. 60/220,233 filed on Jul. 21, 2000, the disclosures of which are hereby incorporated by reference in their entirety for all purposes.

BACKGROUND OF THE INVENTION

The present invention generally relates to a method and system for data rating for wireless devices, and in particular, to mobile or cellular phones and radio phones that are capable of moving from one transmission station to another in a communication network.

More specifically, the method and system of the present invention allows rating of a data communication session to be performed within the wireless device, such as a mobile phone. As a result, by accomplishing the rating within each mobile phone, the communication traffic between a mobile phone and the service provider is reduced thereby expanding the traffic handling capacity of the service provider. A system for rating and billing a voice communication session within a mobile phone is described in U.S. Pat. Nos. 5,577,100 (the '100 patent), and 6,198,915 B1 (the '915 patent).

Advanced data communication services in the mobile telephony environment are becoming a reality. Short Message Service (SMS), Unstructured Supplementary Service Data (USSD), General Packet Radio Service (GPRS), Enhanced Data for GSM Evolution (EDGE), 1x, 1xRTT, short range radio frequency protocols (e.g., IEEE, 802.1 1.b) etc. are all examples of technologies that may be used to implement wireless data communication.

Wireless device users are demanding improved data services, and data carriers are hurriedly trying to develop solutions that would satisfy the demands of such users. However, traditional network-based billing systems are ill equipped to deal with some data carriers' current business practices or methods for billing for data services other than monthly subscription.

For example, monitoring and keeping track of data packets accurately for billing purposes at the network level is not a simple task, especially when such monitoring must be done in real time as required by prepaid and limited use services. When data packets are sent to a destination, they are usually routed via several nodes and networks before they reach their final destination. Traversing several networks presents a problem from a monitoring perspective because different networks and their respective equipment very often handle data packets differently.

Furthermore, typical network-based billing systems are generally equipped to deal with call detail records (CDRs). Such billing systems are usually dimensioned to be able to accommodate 3 or 4 CDRs per user per day. With the use of packet data, each packet generates its own detail record, referred to here as usage detail records (UDRs). A UDR is necessary because in packet switching communications each packet is transmitted to its destination separately via different routing paths. As a result, a UDR is needed for each packet in order to keep track of the status of such packet. The proliferation of a large amount of UDRs presents a capacity problem for many existing billing systems. For instance, a 30-minute session of GPRS may generate 10,000 UDRs or more at several serving nodes, an amount of UDRs which existing billing systems are not equipped to handle and for which purpose it may not be cost effective to upgrade.

Moreover, there is an additional challenge to billing data transmissions, particularly for GPRS. Most of the network equipment required to enable and implement GPRS reside at a base station controller (BSC), while the billing systems reside at a mobile switching center (MSC). The billing systems, accustomed to connecting to one or several MSCs, must now accommodate potentially hundreds of BSCs.

In the packet data environment, the network on many occasions may need to resend the same packet more than once, and possibly through alternate transmission paths. Since multiple UDRs may be generated for the same packet, network-based billing systems can only generate accurate billing on a per packet basis by gathering all of the UDR's from all of the serving nodes and reconciling them to determine successful delivery. Therefore, it would be desirable to provide a cost effective method and system that is capable of rating packet data accurately without the complications and capacity burden inherent in traditional network-based billing systems.

SUMMARY OF THE INVENTION

A method and system for rating a data communication session between a network and a wireless device is disclosed. The rating of the data communication session is accomplished by a data rating application that resides in the wireless device, avoiding the complications and capacity burden inherent in traditional network-based billing systems. In an exemplary embodiment, the method uses a number of factors to determine how to rate a data communication session, i.e, the data communication session is rated based on one of a number of rating options. Examples of such factors include: the application on the wireless devices using the data, data utilization, the source of the data being transmitted to the wireless device, the class of service, the quality of service and transmission efficiency. Typically, the rating option selected includes both how to meter the data and determine the rate to be applied to each metered increment. Examples of methods to meter the data include time (i.e. duration of the data communication session) and volume (e.g. kilobytes or number of packets). In an exemplary embodiment, the method monitors a series of events, namely, a setup event, a begin event and an end event, which take place during a data communication session. By monitoring such events, the data rating application is then able to determine when to evaluate the factors needed to determine how to rate the data communication session as well as, when to begin, and when to end, metering the data communication session. The data rating application is then able to apply the applicable rate to the metered data.

According to an exemplary embodiment of the present invention, a system for rating a data communication session is provided. The system comprises: a wireless device capable of communicating with a network to establish the data communication session; a data rating application residing on the wireless device; wherein the data rating application is configured to detect a number of factors and/or events which take place during the course of conducting the data communication session between the network and the wireless device; wherein the data rating application is further configured to initiate one of a number of rating options to rate the data communication session based on the detected factors and/or events.

According to another exemplary embodiment of the present invention, a method for rating a data communication session between a wireless device and a network is provided. The method comprises: installing a data rating application on the wireless device; causing the data rating application to detect a number of factors and/or events which take place during the course of conducting the data communication session between the wireless device and the network; upon detecting one or more of the factors and/or events, causing the data rating application to initiate one of a number of rating options; upon initiating one of the number of rating options, causing the data rating application to calculate charges for the data communication session based on the initiated rating option.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

DETAILED DESCRIPTION OF THE INVENTION

Figure 1:
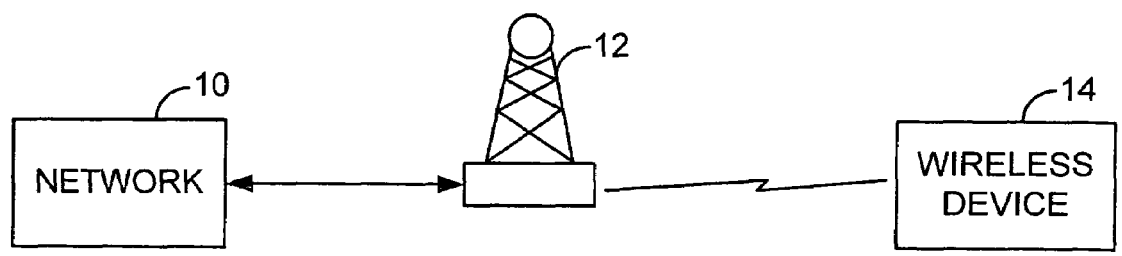
FIG. 1 is a simplified schematic diagram illustrating a typical wireless communication arrangement.

FIG. 1 is a simplified schematic diagram illustrating a typical wireless communication arrangement. A network 10 having a number of applications (not shown) connected thereto communicates with a wireless device 14, such as a cellular phone, via a transmission station 12. More specifically, data from the applications is passed to the network 10 that, in turn, relays it to the transmission station 12 for transmission to the wireless device 14. Data may be transmitted between the network 10 and the wireless device 14 using data packets. That is, data to be transmitted is broken down into data packets and each data packet is then individually transmitted by the network 10 to the wireless device 14 and reassembled in the wireless device 14. The transmission station 12 uses over-the-air communications to communicate with the wireless device 14. Over-the-air communication protocols that can be used to implement wireless communications between the wireless device 14 and the network 10 include, for example, GSM, CDMA, TDMA, UMTS, etc. Furthermore, network data communication protocols that can be used to implement data communication between the wireless device 14 and the network 10 include SMS, USSD, GPRS, EDGE, UMTS, 1x, and 1xRTT. A person of ordinary skill in the art will know of other ways and methods to implement over-the-air communications.

According to an exemplary embodiment of the present invention, the wireless device 14 includes a data rating application that is capable of detecting factors and events in the wireless device 14 that relate to data transmissions to and from the wireless device 14. The factors available for rating the data communication session and the events provided by the network 10, and ultimately the wireless device 14, for detecting those factors are dependent upon the network 10 and the wireless device 14. The data rating application can reside on executable memory within the wireless device 14. Such memory can be one of any type such as ROM, EPROM, or flash memory. The data rating application can store dynamic data in RAM and utilize nonvolatile memory such as EEPROM or flash memory to store control data. Alternatively, the data rating application can reside on a smart card, such as a universal subscriber identification module (USIM) or Removable Universal Identity Module (R-UIM), which is attachable to the wireless device 14.

The data rating application uses a multi-factor rating algorithm to determine the method to be used to rate a data communication session. Examples of factors used in the multi-factor rating algorithm include: the application on the wireless devices 14 using the data, data utilization, the source of the data being transmitted to the wireless device 14, the class of service, and the quality of service. The absence of any factors (default methods), one of the factors, or combinations of the factors determine the method to be used to rate the data communication session.

Typically, the rating method selected includes the method to be used to meter the data, as well as, the tariff or rate to be applied to each increment metered. Examples of methods used to meter the data include the duration of the data communication session and the volume of data transmitted or received during the data communication session. Examples of measures of data volume include kilobytes, number of packets, or some arbitrary denomination, such as 500 kilobytes or 500 packets.

In an exemplary embodiment, a series of events, namely, a setup event, a begin event and an end event, which take place during a data communication session are monitored by the wireless device 14. More specifically, the monitoring of such events is accomplished by the data rating application that resides in the wireless device 14. By monitoring such events, the data rating application is then able to determine when to evaluate the factors needed to determine how to rate the data communication session as well as, when to begin, and when to end, metering the data communication session. The data rating application is then able to apply the applicable rate to the metered data.

In an exemplary embodiment, the data rating application functions in cooperation with, or is a part of, other applications residing on the wireless device 14. For example, the data rating application may be installed on a prepaid debit mobile phone as described in U.S. Pat. No. 5,577,100 (the '100 patent), which is incorporated herein by reference in its entirety. The data rating application when installed on such mobile phone works in conjunction with, or is a part of, the complex billing algorithm used to calculate the charge for a communication session to debit the internal prepaid account correctly and instantaneously. In the case of prepaid, or limited usage, phone applications, the data rating application preferably works with those applications in real time so that the remaining funds or usage can be instantaneously monitored.

Alternatively, the data rating application may simply capture the rating information and forward such information to other applications. For example, the data rating application may forward the rating information with respect to data communication sessions from the wireless device 14 to other applications residing on the network 10 for further processing, such as billing, collection, and settlement.

Furthermore, the data rating application of the present invention is highly scalable to handle any increase or decrease in data rating demand. Because the data rating application utilizes data processing resources within the wireless device 14, each additional user requiring data rating resources also brings a new wireless device 14 and thus the additional data processing resources needed by the user. Utilizing the data processing resources within the wireless device 14 also reduces the burden on the processing capacity of the network 10.

Figure 2:
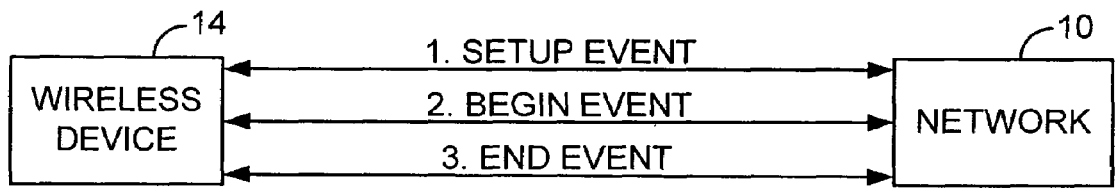
FIG. 2 is a simplified schematic diagram illustrating the general sequence of communication between a network and a wireless device in accordance with the present invention.

FIG. 2 is a simplified schematic diagram illustrating the sequence of communication between the network 10 and the wireless device 14 in accordance with the present invention. When a connection between the network 10 and the wireless device 14 is to be established, a setup event is caused to occur. The setup event signifies that a connection is to be established between the network 10 and the wireless device 14. Upon detection of the setup event for a data communication session, the data rating application determines the values of the factors in its multi-factor rating algorithm, so that it is ready to meter the data communication session upon the occurrence of a begin event. The begin event is typically an event which signifies that the connection between the network 10 and the wireless device 14 is established and that communication can now take place between the network 10 and the wireless device 14. When the connection between the network 10 and the wireless device 14 is to be terminated, an end event is caused to occur which typically signifies the termination of the connection between the network 10 and the wireless device 14.

Depending on the particular situation, the setup event, the begin event and the end event can be originated by either the network 10 or the wireless device 14. It should be understood that the setup event, the begin event and the end event are described herein in a general manner. These events can be detected in various ways depending on the wireless device and the network data communication protocol being used. A person of ordinary skill in the art would know of other ways and methods to detect these events using various different wireless devices and network data communication protocols.

A number of exemplary situations illustrating the sequence of events that take place between the network 10 and the wireless device 14 are provided below. For example, in one situation, if the wireless device 14 is to communicate with another wireless device (not shown), the wireless device 14 then first contacts the network 10 to establish a connection. Contacting the network 10 to establish the connection is the setup event. When the network 10 detects the setup event, the network 10 checks and allocates resources to establish the connection. The network 10 then sends an acknowledgment (ACK) to the wireless device 14 informing the wireless device 14 that a connection is now established. The ACK is the begin event. Upon receiving the ACK, the wireless device 14 is then able to transmit and receive data to and from the network 10. When the wireless device 14 wishes to conclude the data communication session with the network 10, the wireless device 14 then terminates the connection. Alternatively, the connection can also be terminated by the network 10. Terminating the connection is the end event.

In another exemplary situation, if the network 10 wishes to establish a connection with the wireless device 14, for example, due to another wireless device (not shown) desiring to communicate with the wireless device 14, the network 10 checks and allocates resources to establish the connection and then contacts the wireless device 14. Contacting the wireless device 14 to establish the connection is the setup event. When the wireless device 14 detects the setup event, the wireless device 14 sends back an acknowledgement (ACK) to the network 10 informing the network 10 that a connection is now established. The ACK is the begin event. Upon receiving the ACK, the network 10 and the wireless device 14 are then able to communicate with each other. Similarly, when the data communication session between the network 10 and the wireless device 14 is to be concluded, the connection can be terminated by either the network 10 or the wireless device 14. Terminating the connection is the end event.

By monitoring the events, namely the setup event, the begin event, and the end event, the data rating application is then able to determine when to evaluate the factors needed to determine how to rate the data communication session as well as, when to begin, and when to end, metering the data communication session. The following are examples of metering methods that may be used by a rating option.

According to an exemplary metering method, the data communication session between the network 10 and the wireless device 14 is metered by connection. Here, the data rating application only calculates a charge once per connection.

In this exemplary mode of operation, when data rating application detects the begin event signifying that a connection to the network 10 has been established, the data rating application can calculate the charge for the connection at the rate determined by the multifactor rating algorithm. No further metering is necessary. The data rating application may function in cooperation with, or be a part of, other billing applications residing on the wireless device 14 or on the network 10. Depending upon the requirements of the other billing applications, the data rating application passes the calculated charge and other rating information to the other billing applications in real time or upon some other predetermined event. For example, using the prepaid debit mobile phone as described in the '100 patent in conjunction with the data rating application, the data rating application captures and calculates the relevant rating information and cooperates, in real time, with the accounting application in the mobile phone to debit the internal prepaid account accordingly.

According to a second exemplary metering method, the data communication session between the network 10 and the wireless device 14 is metered by time. Here, the data rating application calculates a charge for the data communication session based on the length of time the wireless device 14 is connected to the network 10 exchanging data.

Similarly, in this exemplary mode of operation, when data rating application detects the begin event signifying that a connection to the network 10 has been established, it begins timing the data communication session utilizing a timer residing on the wireless device 14. Alternatively, the timer may reside on the network. When the end event is detected by the data rating application, i.e. termination of the connection by either the network 10 or the wireless device 14, the data rating application stops the timer for that particular data communication session. The data rating application may function in cooperation with, or be a part of, other billing applications residing on the wireless device 14 or on the network 10. Depending upon the requirements of the other billing applications, the data rating application passes the calculated charge and other rating information to the other billing applications in real time or upon some other predetermined event.

According to a third exemplary metering method, the data communication session between the network 10 and the wireless device 14 is metered by volume. Here, the data rating application calculates a charge for the data communication session based on the amount or volume of data downloaded to or uploaded from the wireless device 14 during the communication session. It is to be understood that the unit of measure for the amount of data may vary. For example, data volume can be calculated based on a per kilobyte basis or a per packet basis; billing can also be calculated based on any other arbitrary denomination such as a unit rate per 500 kilobytes or per 500 packets.

In this exemplary mode of operation, when the data rating application detects the begin event, the data rating application begins to keep track of the amount of data downloaded to or uploaded from the wireless device 14 in accordance with the unit of measure required by the applicable rating option. Based on the multi-factor algorithm, the data rating application determines the unit of measure to be tracked and the charge per unit of measure. The ability of the data rating application to measure data and what units of measure are available is dependent on the capabilities of the wireless device 14 to measure data. When the end event is detected by the data rating application, i.e. termination of the connection by either the network 10 or the wireless device 14, the data rating application stops tracking the packets or kilobytes or other unit of measure for that particular data communication session. The data rating application may function in cooperation with, or be a part of, other billing applications residing on the wireless device 14 or on the network 10. Depending upon the requirements of the other billing applications, the data rating application passes the calculated charge and other rating information to the other billing applications in real time or upon some other predetermined event.

For example, if the data communication session is to be billed on a per packet basis, the data rating application keeps track of each downloaded/uploaded data packet and then calculates the cost of each data packet using information from a rating table which contains different rate information. If the data rating application is functioning in cooperation with, or as a part of, the accounting application in a prepaid debit mobile phone as described in the '100 patent, the cost of each data packet is debited from the internal prepaid account in real time.

As mentioned above, the data rating application uses the multi-factor algorithm to determine how to rate a data communication session, i.e., how to meter the data and determine the rate to be applied to each metered increment. The absence of any factors (default methods), one of the factors, or combinations of the factors determine the method used to rate the data communication session. The following are examples of factors that may be used to select a rating option.

According to an exemplary rating option, a factor used to select a rating option is the application in the wireless device 14 that will be using the data from the data communication session between the network 10 and the wireless device 14. For instance, one type of rating option may apply to an e-mail application, and another type of rating option may apply to a music-downloading application. in this exemplary mode of operation, when the wireless device 14 initiates contact with the network 10 to establish a connection, the data rating application detects the setup event, i.e., the initiation of contact with the network 10, and determines which application is requesting the data communication session and uses this information in selecting a rating option.

According to a second exemplary rating option, a factor used to select a rating option is based on data utilization, or more specifically, the rating for data obtained during the data communication session between the network 10 and the wireless device 14 is based on the wireless device 14 (or an application thereon) using the data (which itself may be an application). For example, if the data obtained by the wireless device 14 during a data communication session is a game application, when the game application is initiated or executed, the data rating application uses this information in selecting a rating option.

According to a third exemplary rating option, a factor used to select a rating option is the source of the data transmitted during the data communication session between the network 10 and the wireless device 14. The source of data may be referred to as the originating site in the case of data being pushed to the wireless device. The source of data may also be referred to as the destination site in the case of data being pulled to the wireless by request of the user. For instance, one type of rating option may apply to an origination site that pushes flight update information to the wireless device. In this exemplary mode of operation, when the network 10 contacts the wireless device 14 to establish a connection, the data rating application detects the setup event, i.e., the initiation of contact with the network 10, and determines which site is initiating the data communication session and uses this information in selecting a rating option. In another example, another type of rating option may apply to a destination site such as Lexis/Nexis. In this exemplary mode of operation, when the wireless device 14 initiates contact with the network 10 to establish a connection, the data rating application detects the setup event, i.e., the initiation of contact with the network 10, and determines which site the user is attempting to reach and uses this information in selecting a rating option.

According to a fourth exemplary rating option, a factor used to select a rating option is the class of service used for the data communication session between the network 10 and the wireless device 14. Here, the data rating application bills the data communication session based on the type of connectivity a user chooses for the wireless device 14 to transmit and receive data packets. Different types of connectivity include, for example, SMS, USSD, GPRS, etc. In this exemplary mode of operation, when the wireless device 14 initiates contact with the network 10 to establish a connection, the data rating application detects the setup event, i.e., the initiation of contact with the network 10. Furthermore, the user is given a choice to select, or may have previously selected, the class of service which is to be used by the wireless device 14 to transmit and receive data for the pending data communication session. The data rating application uses this information in selecting a rating option.

According to a fifth exemplary rating option, a factor used to select a rating option is the quality of service used for the data communication session between the network 10 and the wireless device 14. Here, the data rating application bills the data communication session based on the quality of service a user chooses for the wireless device 14 to transmit and receive data packets. Different networks permit requests for connections to be given varying levels of quality of service, and based on such requests allocate greater network resources to serve such connections accordingly. In this exemplary mode of operation, when the wireless device 14 initiates contact with the network 10 to establish a connection, the data rating application detects the setup event, i.e., the initiation of contact with the network 10. Furthermore, the user is given a choice to select, or may have previously selected, the quality of service which is to be used by the wireless device 14 to transmit and receive data for the pending data communication session. The data rating application uses this information in selecting a rating option.

According to a sixth exemplary rating option, a factor used to select a rating option is data transmission efficiency for the data communication session between the network 10 and the wireless device 14. Here, the data rating application calculates charges for the data communication session based on the successful delivery and/or receipt of data packets by the wireless device 14. For example, at the end of a data communication session the data rating application may determine that one hundred (100) data packets were required to successfully deliver fifty (50) data packets of data. Based on this determination, the data rating application then works in conjunction with other accounting applications to credit an account to reflect the poor quality of service received during the data communication session.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for determining a charge in connection with a data communication session, comprising:
    a wireless device capable of communicating data within a network during a data communication session;
    a multi-factor data rating algorithm residing within said wireless device;
    wherein said data rating algorithm selects an applicable rate based on one or more of the following factors: type of data, source of the data, service level selected, and/or service level achieved;
    wherein said selected rate is a quantity of money per unit of measure;
    wherein available units of measure include quantity of bytes, quantity of data packets and/or other denomination of data quantity involved in a data communication session;
    wherein a charge is determined within said wireless device by applying said selected rate to a number of units of measure as metered by said wireless device for said data communication session; and
    wherein said charge is deducted from an account related to the wireless device.

2. The system according to claim 1 wherein the wireless device is a mobile phone.

3. The system according to claim 1 wherein said algorithm selects an applicable rate based on only one of the following factors: type of data, source of the data, service level selected, and/or service level achieved.

4. The system according to claim 1 wherein the data rating algorithm is configured to detect one or more of a plurality of events which takes place during the course of setting up the data communication session;
    wherein the one or more events is indicative of type of data, source of the data, and/or service level selected; and
    wherein the origin of the event is either the network or the wireless device.

5. The system according to claim 1 wherein the data rating algorithm is configured to begin determining the charge in connection with the data communication session after detecting a begin event which takes place during the course of the data communication session; and
    wherein the begin event is originated by either the network or the wireless device to indicate that the data communication session has begun.

6. The system according to claim 1 wherein the data rating algorithm is configured to end determining the charge in connection with the data communication session after detecting an end event which takes place during the course of the data communication session; and
    wherein the end event is originated by either the network or the wireless device to indicate that the data communication session has ended.

7. The system according to claim 1 wherein the data rating algorithm resides on a smart card which is attachable to the wireless device.

8. The system according to claim 1 wherein the wireless device includes a plurality of applications residing therein; and wherein the data rating algorithm is configured to determine the rate based on which one of the plurality of applications residing in the wireless device will be using data received by the wireless device during the data communication session.

9. The system according to claim 1 wherein the charge is based on source of data received by the wireless device during the data communication session.

10. The system according to claim 1 wherein the charge is based on service level achieved during the data communication session.

11. The system according to claim 1 wherein the charge is based on the type of data communicated during the data communication session.

12. The system according to claim 11 wherein the data received during the data communication session is a downloaded application; and
    wherein the charge is determined based on the number of times the downloaded application is subsequently run and/or the duration of time it is subsequently run.

13. The system according to claim 1 wherein the charge is based on service level selected for the data communication session.

14. The system according to claim 13 wherein the service level selected relates to speed and/or accuracy of data transmission during the data communication session.

15. The system according to claim 1 wherein the data rating algorithm is configured to deduct from a prepaid account relating to the wireless device.

16. The system according to claim 15 wherein the account resides in the wireless device.

17. The system according to claim 15 wherein the account resides at a location external to the wireless device.

18. A wireless device for determining a charge in connection with a data communication session, comprising:
    a multi-factor data rating algorithm residing on said wireless device which determines the charge in connection with the data communication session by applying a rate to a number of units of measure as metered by said wireless device;
    wherein said data rating algorithm selects said rate based on one or more of the following factors: type of data, source of the data, service level selected, and/or service level achieved; and
    wherein said selected rate is quantity of money per unit of measure;

wherein the available units of measure include the quantity of bytes, quantity of data packets and/or other denomination of data quantity involved in said data communication;

wherein said charge is deducted from an account related to the wireless device; and wherein the wireless device is configured to communicate within a network.

19. The wireless device according to claim 18 wherein the wireless device is a mobile phone.

20. The wireless device according to claim 18 wherein said algorithm selects an applicable rate based on only one of the following factors: type of data, source of the data, service level selected, and/or service level achieved.

21. The wireless device according to claim 18 wherein the data rating algorithm is configured to detect one or more of a plurality of events which takes place during the course of setting up the data communication session;

wherein the one or more events is indicative of type of data, source of data, and/or service level selected; and wherein the origin of the event is either the network or the wireless device.

22. The wireless device according to claim 18 wherein the data rating algorithm is configured to begin determining the charge in connection with the data communication session after detecting a begin event which takes place during the course of the data communication session; and wherein the begin event is originated by either the network or the wireless device to indicate that the data communication session has begun.

23. The wireless device according to claim 18 wherein the data rating algorithm is configured to end determining the charge in connection with the data communication session after detecting an end event which takes place during the course of the data communication session; and wherein the end event is originated by either the network or the wireless device to indicate that the data communication session has ended.

24. The wireless device according to claim 18 wherein the data rating algorithm resides on a smart card which is attachable to the wireless device.

25. The wireless device according to claim 18 wherein the wireless device includes a plurality of applications residing therein; and wherein the data rating algorithm is configured to determine the rate based on which one of the plurality of applications residing in the wireless device will be using data received by the wireless device during the data communication session.

26. The wireless device according to claim 18 wherein the charge is based on source of data received by the wireless device during the data communication session.

27. The wireless device according to claim 18 wherein the charge is based on service level achieved during the data communication session.

28. The wireless device according to claim 18 wherein the charge is based on type of data transmitted during the data communication session.

29. The wireless device according to claim 28 wherein the data received during the data communication session is a downloaded application; and wherein the charge is determined based on the number of times the downloaded application is subsequently run and/or the duration of time it is subsequently run.

30. The wireless device according to claim 18 wherein the charge is based on service level selected for the data communication session.

31. The wireless device according to claim 30 wherein the service level selected relates to speed and/or accuracy of data transmission during the data communication session.

32. The wireless device according to claim 18 wherein the data rating algorithm is configured to deduct from a prepaid account relating to the wireless device.

33. The wireless device according to claim 32 wherein the account resides in the wireless device.

34. The wireless device according to claim 32 wherein the account resides at a location external to the wireless device.

35. A smart card configured to cooperate with a wireless device capable of communicating within a network to determine a charge in connection with a data communication session, comprising:

a multi-factor data rating algorithm residing on said smart card which determines the charge in connection with the data communication session by applying a rate to a number of units of measure as metered by said wireless device;

wherein said data rating algorithm selects said rate based on one or more of the following factors: type of data, source of the data, service level selected, and/or service level achieved;

wherein said selected rate is a quantity of money per unit of measure;

wherein the available units of measure include the quantity of bytes, quantity of data packets and/or other denomination of data quantity involved in said data communication;

wherein said charge is deducted from an account related to the wireless device or smart card; and an interface configured to allow the smart card to communicate with the wireless device.

36. The smart card according to claim 35 wherein the wireless device is a mobile phone.

37. The smart card according to claim 35 wherein said algorithm selects an applicable rate based on only one of the following factors: type of data, source of data, service level selected and/or service level achieved.

38. The smart card according to claim 35 wherein the data rating algorithm is configured to detect one or more of a plurality of events which takes place during the course of setting up the data communication session;

wherein the one or more events is indicative of the type of data, the source of the data, and/or the service level selected; and wherein the origin of the event is either the network or the wireless device.

39. The smart card according to claim 35 wherein the data rating algorithm is configured to begin determining the charge in connection with the data communication session after detecting a begin event which takes place during the course of the data communication session; and wherein the begin event is originated by either the network or the wireless device to indicate that the data communication session has begun.

40. The smart card according to claim 35 wherein the data rating algorithm is configured to end determining the charge in connection with the data communication session after detecting an end event which takes place during the course of the data communication session; and wherein the end event is originated by either the network or the wireless device to indicate that the data communication session has ended.

41. The smart card according to claim 35 wherein the wireless device and/or the smart cart include a plurality of applications residing therein; and wherein the data rating algorithm is configured to determine the rate based on which one of the plurality of applications residing in the wireless device and/or the smart card will be using data received by the wireless device during the data communication session.

42. The smart card according to claim 35 wherein the charge is based on source of data received by the wireless device during the data communication session.

43. The smart card according to claim 35 wherein the charge is based on service level achieved during the data communication session.

44. The smart card according to claim 35 wherein the charge is based on the type of data transmitted during the data communication session.

45. The smart card according to claim 44 wherein the data received during the data communication session is a downloaded application; and
wherein the charge is determined based on the number of times the downloaded application is subsequently run and/or the duration of time it is subsequently run.

46. The smart card according to claim 35 wherein the charge is based on service level selected for the data communication session.

47. The smart card according to claim 46 wherein the service level selected relates to speed and/or accuracy of data transmission during the data communication session.

48. The smart card according to claim 35 wherein the data rating algorithm is configured to deduct from a prepaid account relating to the wireless device.

49. The smart card according to claim 48 wherein the account resides in the smart card.

50. The smart card according to claim 48 wherein the account resides at a location external to the smart card.

51. A method for determining a charge in connection with a data communication session, comprising:
installing a multi-factor data rating algorithm in a wireless device capable of communicating within a network;
causing the data rating application to determine the charge in connection with the data communication session by applying a rate to a number of units of measure as metered by said wireless device;
wherein the data rating algorithm selects said rate based upon one or more of the following factors: type of data, source of the data, service level selected, and/or service level achieved;
wherein said selected rate is a quantity of money per unit of measure;
wherein the available units of measure include the quantity of bytes, quantity of data packets and/or other denomination of data quantity involved in said data communication; and
wherein said charge is deducted from an account related to the wireless device.

52. The method of claim 51 wherein the wireless device is a mobile phone.

53. The method of claim 51 wherein said algorithm selects an applicable rate based on only one of the following factors: type of data, source of data, service level selected and/or service level achieved.

54. The method of claim 51 further comprising:
prior to causing the data rating algorithm to determine the charge, causing the data rating algorithm to detect one or more of a plurality of events which takes place during the course of setting up the data communication session;
wherein the one or more events is indicative of the type of data, source of the data, and/or service level selected; and
wherein the origin of the event is either the network or the wireless device.

55. The method of claim 51 further comprising:
causing the data rating algorithm to begin determining the charge after detecting a begin event which takes place during the course of the data communication session;
wherein the begin event is originated by either the network or the wireless device to indicate that the data communication session has begun.

56. The method of claim 51 further comprising:
causing the data rating algorithm to end determining the charge after detecting an end event which takes place during the course of the data communication session;
wherein the end event is originated by either the network or the wireless device to indicate that the data communication session has ended.

57. The method of claim 51 wherein the data rating algorithm resides in a smart card which is attachable to the wireless device.

58. The method of claim 51, wherein the wireless device includes a plurality of applications residing therein, further comprising:
selecting the applicable rates based on which one of the plurality of applications residing in the wireless device will be using data received by the wireless device during the data communication session.

59. The method of claim 51 further comprising:
determining the charge based on source of data received by the wireless device during the data communication session.

60. The method of claim 51 further comprising:
determining the charge based on service level achieved during the data communication session.

61. The method of claim 51 further comprising:
determining the charge based on type of data transmitted during the data communication session.

62. The method of claim 61, wherein the data received during the data communication session is a downloaded application, further comprising:
determining the charge based on the number of times the downloaded application is subsequently run and/or the duration of time it is subsequently run.

63. The method of claim 51 further comprising:
determining the charge based on service level selected for the data communication session.

64. The method of claim 63 wherein the service level selected relates to speed and/or accuracy of data transmission during the data communication session.

65. The method of claim 51 wherein said charge is deducted from a prepaid account relating to the wireless device.

66. The method of claim 65 wherein the account resides in the wireless device.

67. The method of claim 65 wherein the account resides at a location external to the wireless device.

* * * * *